US010374945B1

(12) United States Patent
Dhanabalan et al.

(10) Patent No.: US 10,374,945 B1
(45) Date of Patent: Aug. 6, 2019

(54) APPLICATION-CENTRIC METHOD TO FIND RELATIVE PATHS

(71) Applicant: Citrix Systems, Inc., Fort Lauderdale, FL (US)

(72) Inventors: Praveen Raja Dhanabalan, Bengaluru (IN); Surya Prakash Patel, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 15/927,125

(22) Filed: Mar. 21, 2018

(51) Int. Cl.

| | |
|---|---|
| ***H04L 12/725*** | (2013.01) |
| ***H04L 12/721*** | (2013.01) |
| ***H04L 12/729*** | (2013.01) |
| ***H04L 12/707*** | (2013.01) |
| ***H04L 29/06*** | (2006.01) |
| ***H04L 12/841*** | (2013.01) |
| ***H04L 12/801*** | (2013.01) |
| ***H04L 12/859*** | (2013.01) |

(52) U.S. Cl.
CPC .......... *H04L 45/302* (2013.01); *H04L 45/123* (2013.01); *H04L 45/125* (2013.01); *H04L 45/22* (2013.01); *H04L 45/24* (2013.01); *H04L 47/2475* (2013.01); *H04L 47/283* (2013.01); *H04L 47/29* (2013.01); *H04L 65/80* (2013.01)

(58) Field of Classification Search
None
See application file for complete search history.

(56) References Cited

U.S. PATENT DOCUMENTS

| | | | | |
|---|---|---|---|---|
| 7,936,698 B1 * | 5/2011 | Sarkar | .................. | H04B 17/345 370/252 |
| 2010/0011056 A1 * | 1/2010 | Bryson | .................. | H04L 67/24 709/203 |
| 2017/0135147 A1 * | 5/2017 | Belghoul | .............. | H04W 76/36 |
| 2019/0036788 A1 * | 1/2019 | Gupta | .................. | H04L 41/147 |

* cited by examiner

*Primary Examiner* — Anh Ngoc M Nguyen
(74) *Attorney, Agent, or Firm* — Foley & Lardner LLP; Christopher J. McKenna; Daniel Rose

(57) ABSTRACT

The systems and methods discussed herein provide for network communications via a plurality of paths, responsive to network traffic characteristics such as class, quality of service (QoS) requirements, application, network delay, loss rates, jitter, bandwidth, and application chattiness. Path selection may be application-specific, as one path that is bad or inadequate for the requirements of one application may be good or adequate for the requirements of a second application. By taking into account application-specific communications characteristics, as well as network path characteristics, path selection may be optimized, resulting in higher quality of service for each application, better throughput, and more efficient use of bandwidth and network resources.

20 Claims, 6 Drawing Sheets

230

| Link | Latency | Loss Rate | Bandwidth | Packet Size | *n* packets per second | Net Transmission Time for *n* packets |
|---|---|---|---|---|---|---|
| A | 100ms | 1% | 8Mbps | 1500B | 667 | 1800ms |
| B | 60ms | 2% | 8Mbps | 1500B | 667 | 1900ms |
| C | 60ms | 4% | 8Mbps | 1500B | 667 | 2740ms |

| Application | Example | Class |
|---|---|---|
| Bulky | File transfer | A (Low priority) |
| Interactive | Shared access (SMB), Web browsing, etc. | B (Medium Priority) |
| Real-time | Video Conference | C (High Priority) |

| Application | Server | Upstream Chattiness | Downstream Chattiness | Application Operation | Current Queuing Information |
|---|---|---|---|---|---|
| CIFS | Example.com | 10 packets | 40 packets | READ | 30 packets |
| CIFS | Example.com | 60 packets | 5 packets | WRITE | 10 packets |
| SMB | Example.org | 15 packets | 50 packets | READ | 20 packets |
| SMB | Example.org | 50 packets | 10 packets | WRITE | 15 packets |

APPLICATION-CENTRIC METHOD TO FIND RELATIVE PATHS

FIELD OF THE DISCLOSURE

The present application generally relates to path selection for network communications.

BACKGROUND OF THE DISCLOSURE

Techniques such as wide area network (WAN) virtualization, link aggregation, connection pooling, and other such methods utilize a plurality of network paths between a source and destination for distribution of communications. In many implementations, intermediary devices, sometimes referred to as network accelerators, WAN virtualizers, or by similar terms, may be deployed between endpoints (e.g. clients, servers, or other computing devices) and may provide load balancing and distribution of packets on a plurality of paths via a network (e.g. via further intermediary devices, such as switches, routers, gateways, or other such devices).

BRIEF SUMMARY OF THE DISCLOSURE

The systems and methods discussed herein provide for path selection for network communications via a plurality of paths, responsive to network traffic characteristics such as class, quality of service (QoS) requirements, application, network delay, loss rates, jitter, bandwidth, and application chattiness. Path selection may be application-specific, as one path that is bad or inadequate for the requirements of one application may be good or adequate for the requirements of a second application. By taking into account application-specific communications characteristics, as well as network path characteristics, path selection may be optimized, resulting in higher quality of service for each application, better throughput, and more efficient use of bandwidth and network resources.

In one aspect, the present disclosure is directed to a method for application-based network path selection. The method includes establishing, by a first device, communications with a second device via each of a first network path and a second network path. The method also includes identifying, by the first device, an application corresponding to a packet for transmission. The method also includes determining, by the first device, whether an estimated chattiness of the application exceeds a threshold. The method includes transmitting, by the first device to the second device, the packet via a selected one of the first network path and the second network path. The first network path is selected responsive to the estimated chattiness exceeding the threshold and the first network path having a lower net transmission time for the predetermined number of packets than the second network path, and the second network path is selected responsive to the estimated chattiness not exceeding the threshold and the second network path having a lower latency than the first network path.

In some implementations, the method includes measuring a chattiness of the application; and recalculating the estimated chattiness as a weighted average of the measured chattiness of the application and at least one prior measured chattiness of the application. In a further implementation, the packet is transmitted via the first network path, and the method includes determining that the measured chattiness of the application does not exceed the threshold; and responsive to the determination that the measured chattiness of the application does not exceed the threshold, transmitting an additional received packet corresponding to the application via the second network path. In another further implementation, the packet is transmitted via the second network path, and the method includes determining that the measured chattiness of the application exceeds the threshold; and responsive to the determination that the measured chattiness of the application exceeds the threshold, transmitting an additional received packet corresponding to the application via the first network path. In another further implementation, the method includes recalculating the estimated chattiness by determining that the measured chattiness and the estimated chattiness have values on opposite sides of the threshold; and responsive to the determination that the measured chattiness and the estimated chattiness have values on opposite sides of the threshold, increasing a weight for the measured chattiness in the weighted average. In another further implementation, the method includes recalculating the estimated chattiness by determining that the measured chattiness and the estimated chattiness have values on the same side of the threshold; and responsive to the determination that the measured chattiness and the estimated chattiness have values on the same side of the threshold, decreasing a weight for the measured chattiness in the weighted average.

In some implementations, the method includes identifying a priority level of the received packet, from a plurality of predetermined priority levels. In a further implementation, the received packet has a first priority level, and the method includes receiving an additional packet having a second priority level lower than the first priority level; and responsive to the additional packet having the second priority level lower than the first priority level and responsive to the first network path having lower net transmission time for the predetermined number of packets than the second network path, transmitting the additional packet via the first network path. In another further implementation, the received packet has a first priority level, and the method includes receiving an additional packet having a second priority level higher than the first priority level; and responsive to the additional packet having the second priority level higher than the first priority level and responsive to the second network path having lower latency than the first network path, transmitting the additional packet via the second network path. In some implementations, the method includes determining whether the estimated chattiness of the application exceeds the threshold by calculating the threshold based on a bandwidth delay product and an average number of active connections between the first device and the second device.

In another aspect, the present disclosure is directed to a system for application-based network path selection. The system includes a first device in communication with a second device via each of a first network path and a second network path. The first device comprises a path selector configured to: identify an application corresponding to a packet to be transmitted, determine whether an estimated chattiness of the application exceeds a threshold, and select either the first network path or the second network path. The first network path is selected responsive to the estimated chattiness exceeding the threshold and the first network path having a lower net transmission time for the predetermined number of packets than the second network path; and the second network path is selected responsive to the estimated chattiness not exceeding the threshold and the second network path having a lower latency than the first network path. The first device is configured transmit the packet via the selected network path to the second device.

In some implementations, the path selector is further configured to: measure a chattiness of the application; and recalculate the estimated chattiness as a weighted average of the measured chattiness of the application and at least one prior measured chattiness of the application. In a further implementation, the packet is transmitted via the first network path, and the path selector is further configured to: determine that the measured chattiness of the application does not exceed the threshold, and responsive to the determination that the measured chattiness of the application does not exceed the threshold, select to transmit an additional received packet corresponding to the application via the second network path. In another further implementation, the packet is transmitted via the second network path, and the path selector is further configured to: determine that the measured chattiness of the application exceeds the threshold; and responsive to the determination that the measured chattiness of the application exceeds the threshold, select to transmit an additional received packet corresponding to the application via the first network path. In another further implementation, the path selector is further configured to: determine that the measured chattiness and the estimated chattiness have values on opposite sides of the threshold; and responsive to the determination that the measured chattiness and the estimated chattiness have values on opposite sides of the threshold, increase a weight for the measured chattiness in the weighted average. In another further implementation, the path selector is further configured to: determine that the measured chattiness and the estimated chattiness have values on the same side of the threshold; and responsive to the determination that the measured chattiness and the estimated chattiness have values on the same side of the threshold, decrease a weight for the measured chattiness in the weighted average.

In some implementations, the path selector is further configured to identify a priority level of the received packet, from a plurality of predetermined priority levels. In a further implementation, the received packet has a first priority level, and the path selector is further configured to: responsive to an additional packet received by the first device for transmission to the second device having a second priority level lower than the first priority level and responsive to the first network path having lower net transmission time for the predetermined number of packets than the second network path, select to transmit the additional packet via the first network path. In another further implementation, the received packet has a first priority level, and the path selector is further configured to: responsive to an additional packet, received by the first device for transmission to the second device, having a second priority level higher than the first priority level and responsive to the second network path having lower latency than the first network path, select to transmit the additional packet via the second network path. In some implementations, the path selector is further configured to calculate the threshold based on a bandwidth delay product and an average number of active connections between the first device and the second device.

The details of various embodiments of the invention are set forth in the accompanying drawings and the description below.

BRIEF DESCRIPTION OF THE FIGURES

The foregoing and other objects, aspects, features, and advantages of the present solution will become more apparent and better understood by referring to the following description taken in conjunction with the accompanying drawings, in which:

FIG. 2B is a table illustrating an embodiment of a path characteristic table;

FIG. 2C is a table illustrating relative application classes and types, according to one implementation;

FIG. 2D is a table illustrating an embodiment of an application characteristic table;

Figure 1:
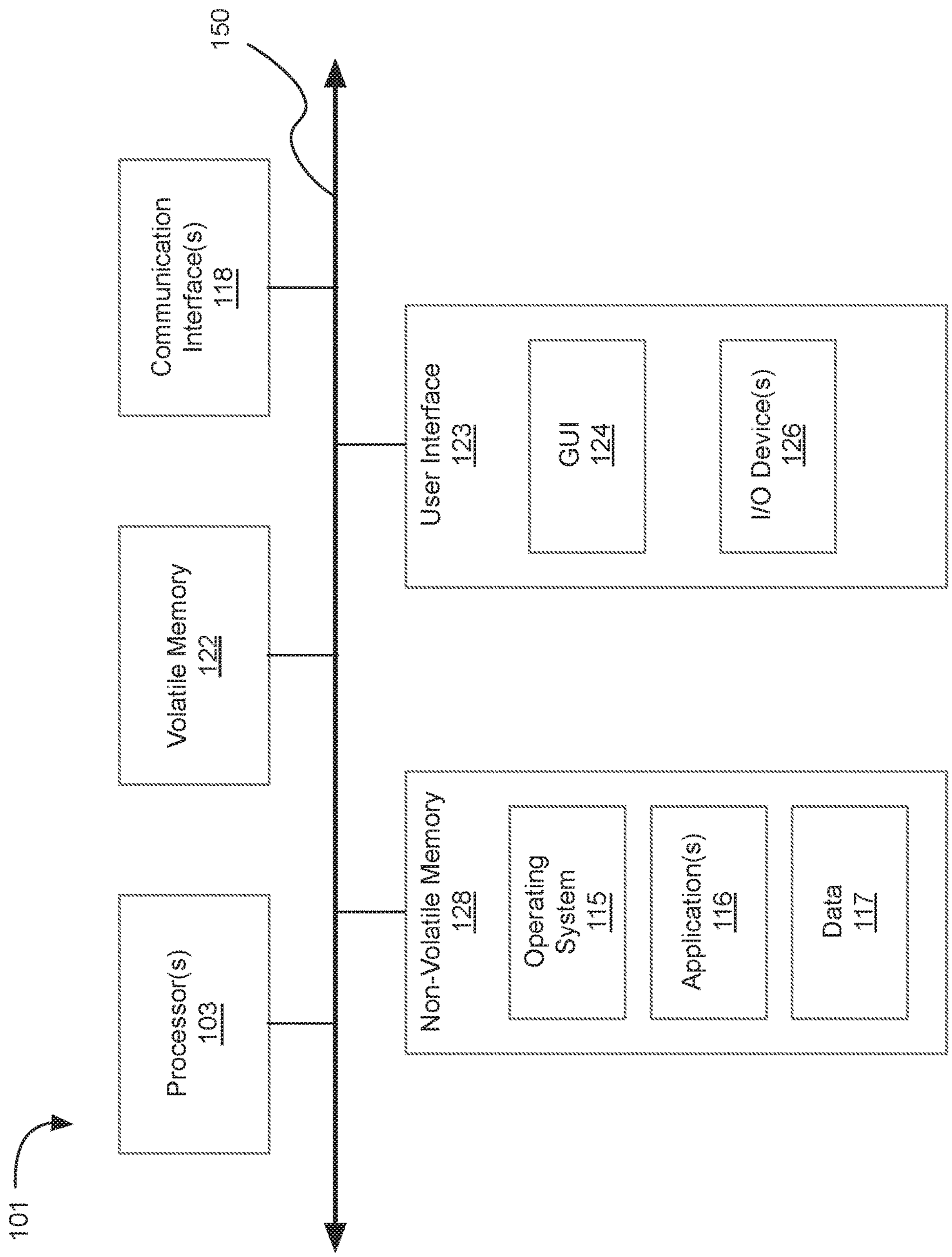
FIG. 1 is a block diagram illustrating an implementation of a network environment for use with the systems and methods discussed herein.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

- Section A describes a network environment and computing environment which may be useful for practicing embodiments described herein;
- Section B describes embodiments of systems and methods for application-centric network path selection.

A. Computing Environment

Prior to discussing the specifics of embodiments of the systems and methods of application-centric path selection, it may be helpful to discuss the computing environments in which such embodiments may be deployed.

As shown in FIG. 1, computer 101 may include one or more processors 103, volatile memory 122 (e.g., random access memory (RAM)), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, one or more accelerometers, etc.). Non-volatile memory 128 stores operating system 115, one or more applications 116, and data 117 such that, for example, computer instructions of operating system 115 and/or applications 116 are executed by processor(s) 103 out of volatile memory 122. In some embodiments, volatile memory 122 may include one or more types of RAM and/or a cache memory that may offer a faster response time than a main memory. Data may be entered using an input device of GUI 124 or received from I/O device(s) 126. Various elements of computer 101 may communicate via one or more communication buses, shown as communication bus 150.

Computer 101 as shown in FIG. 1 is shown merely as an example, as clients, servers, intermediary and other networking devices and may be implemented by any computing or processing environment and with any type of machine or set of machines that may have suitable hardware and/or software capable of operating as described herein. Processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A "processor" may perform the function, operation, or sequence of operations using digital values and/or using analog signals. In some embodiments, the "processor" can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors. A processor including multiple processor cores and/or multiple processors multiple processors may provide functionality for parallel, simultaneous execution of instructions or for parallel, simultaneous execution of one instruction on more than one piece of data.

Communications interfaces 118 may include one or more interfaces to enable computer 101 to access a computer network such as a Local Area Network (LAN), a Wide Area Network (WAN), a Personal Area Network (PAN), or the Internet through a variety of wired and/or wireless or cellular connections.

In described embodiments, the computing device 101 may execute an application on behalf of a user of a client computing device. For example, the computing device 101 may execute a virtual machine, which provides an execution session within which applications execute on behalf of a user or a client computing device, such as a hosted desktop session. The computing device 101 may also execute a terminal services session to provide a hosted desktop environment. The computing device 101 may provide access to a computing environment including one or more of: one or more applications, one or more desktop applications, and one or more desktop sessions in which one or more applications may execute.

Additional details of the implementation and operation of network environment, computer 101 and client and server computers may be as described in U.S. Pat. No. 9,538,345, issued Jan. 3, 2017 to Citrix Systems, Inc. of Fort Lauderdale, Fla., the teachings of which are hereby incorporated herein by reference.

B. Systems and Methods for Application-Centric Network Path Selection

Techniques such as wide area network (WAN) virtualization, link aggregation, connection pooling, and other such methods utilize a plurality of network paths between a source and destination for distribution of communications. In many implementations, intermediary devices, sometimes referred to as network accelerators, WAN virtualizers, or by similar terms, may be deployed between endpoints (e.g. clients, servers, or other computing devices) and may provide load balancing and distribution of packets on a plurality of paths via a network (e.g. via further intermediary devices, such as switches, routers, gateways, or other such devices).

For example, in many implementations, devices (either endpoints or intermediaries) may communicate via a plurality of potential network paths. These paths may be entirely independent (e.g. via different physical network connections, and/or different types of networks such as satellite, cable, or cellular networks) or may be partly independent (e.g. via one or more intermediary devices or network segments in common, as well as one or more different intermediary devices or network segments). For example, in one such implementation, a first device in Boston may communicate with a second device in Los Angeles via a first path via New York, a second path via Chicago, or a third path via Houston. These separate paths may be provided via various intermediary switches, gateways, hubs, load balancers, or other entities.

Each network path may have different characteristics as a result of different intermediary devices (or different numbers of intermediary devices), different physical paths and lengths, and other traffic flowing via said path. For example, each path may have similar or different values for bandwidth, latency, loss rates, and jitter.

Network traffic may have various requirements, depending on the type of traffic or associated application. Simple network load distribution algorithms may select network paths regardless of these requirements, attempting to steer all traffic via a lowest latency path or lowest loss rate path. However, in practice, these paths may not be "best" for various applications; different application requirements may mean that different paths are better for specific applications, in terms of overall throughput or efficiency.

Accordingly, the present disclosure is directed to intelligent optimization of network path selection, taking into account these separate application requirements. Specifically, the systems and methods discussed herein provide for path selection for network communications via a plurality of paths, responsive to network traffic characteristics such as class, quality of service (QoS) requirements, application, network delay, loss rates, jitter, bandwidth, and application chattiness. Path selection may be application-specific, as one path that is bad or inadequate for the requirements of one application may be good or adequate for the requirements of a second application. By taking into account application-specific communications characteristics, as well as network path characteristics, path selection may be optimized, resulting in higher quality of service for each application, better throughput, and more efficient use of bandwidth and network resources. The system may also reduce interference and required re-scheduling of low priority connections and high-priority connections.

Although generally discussed in connection with terms such as a "good" path or "bad" path, or "higher" or "lower" characteristics (such as latency or loss rate), these terms are only used in a relative sense in comparison to other paths or characteristics. Thus, in one implementation, a "good" path may have less than 10% loss rate while a "bad" path may have greater than 10% loss rate; while in another implementation, a "good" path may have less than 1% loss rate while a "bad" path may have greater than 1% loss rate. Thus, the use of these relative terms should be considered only in relation to other such values.

Furthermore, although primarily discussed in connection with intermediary devices or WAN virtualizers or accelerators, the systems and methods discussed herein may be applied on endpoint devices (e.g. clients or servers). Thus, the "intermediary" may include a network stack or network interface of a computing device and be intermediary to applications or an operating system of the computing device and external devices.

Figure 2A:
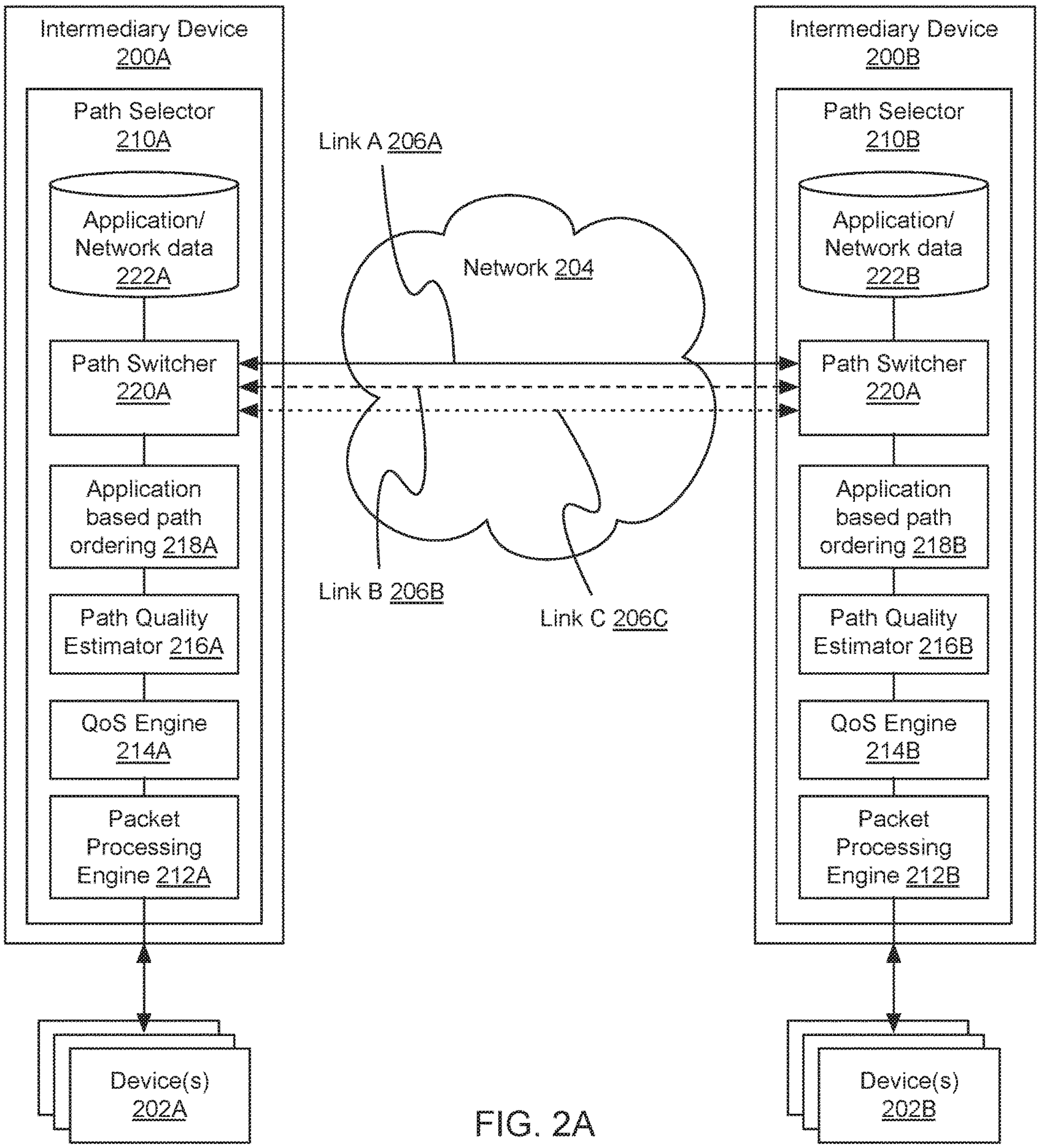
FIG. 2A is a block diagram illustrating an implementation of a computing environment for application-centric path selection.

FIG. 2A is a block diagram illustrating an implementation of a computing environment for application-centric path selection. A pair of devices 200A-200B, referred to generally as computing devices 200, intermediary devices, endpoint devices, client devices, server devices, WAN virtualizers, gateways, access points, network accelerators, or other such terms, may communicate via one or more networks 204. In some implementations, devices 200 may serve as intermediaries for communications of other devices 202A-202B, referred to generally as client devices and/or server devices. In other implementations, devices 200 may be clients or servers.

Network 204 may comprise one or more networks, such as local area networks (LANs), wide area networks (WANs) such as the Internet, cellular networks, satellite networks, broadband networks, virtual private networks (VPNs), or any combination of these or other networks. Network 204 may be homogenous or heterogeneous in type (e.g. including both fiber optic and copper networking, or networks of various types such as satellite and cable networks). Network 204 may comprise a plurality of additional devices (not illustrated) including gateways, access points, routers, switches, network accelerators, firewalls, traffic inspectors, filters, encryptors and decryptors, compressors and decompressors, multiplexers and demultiplexers, or other such devices.

Devices 200 may communicate via a plurality of network links or paths 206A-206C, referred to generally as links or paths 206. Although only three links are shown in FIG. 2A, in practice, devices 200 may communicate via many more links or paths. Referring briefly ahead to FIG. 2B, illustrated is an embodiment of a path characteristic table. Each link or path 206 may have various characteristics, which may be measured by a device 200 with measured values stored in a table 230 maintained by device 200. A subset of network characteristics is illustrated, including latency, loss rate, bandwidth, and maximum packet size or maximum transmission unit (MTU). Table 230 also illustrates the result of calculations of a number of packets n that may be transmitted via the link per second, as well as the net transmission time for n packets. The number of packets n that may be transmitted per second is based on the bandwidth and packet size. For the three example links illustrated, given 8 Megabits/second (or 1 Megabyte/second) bandwidth and a packet size of 1500 Bytes, each link can transmit 1,000,000 Bytes/second divided by 1500 Bytes, or 666.67 packets.

The net transmission time is based on this calculated throughput, but also takes into account packet loss rates and latency. Specifically, the net transmission time for the number of packets n is equivalent to the transmission duration (i.e. one second), plus the link latency, plus the retransmission latency, which is equivalent to the link latency multiplied by the product of the loss rate and the number of packets to be communicated. If the loss rate is 0%, the retransmission latency disappears, and the net transmission time is equal to the transmission duration plus the link latency (e.g. 1100 ms for Link A). However, because some amount of the transmitted packets will be lost (e.g. 1% of the 667 packets for Link A, or 7 packets), these packets will need to be retransmitted. This adds to the result the number of retransmitted packets times the latency, as each packet must be identified as lost prior to being retransmitted (e.g. via a negative acknowledgement or NACK, or a retransmission timeout). Thus, for Link A, the net transmission time for the 667 packets is 1 second plus 100 ms propagation delay or latency; plus 100 ms*(1%*667 packets), or 100 ms*7 retransmitted packets, or 700 ms; for a total of 1800 ms. For Link B, with lower latency but a higher loss rate, the result is 1 second plus 60 ms propagation delay plus 840 ms retransmission delay (60 ms*14 retransmitted packets) or 1900 ms. For Link C, with latency equal to that of Link B, but a higher loss rate still, the result is 1 second plus 60 ms propagation delay plus 1680 ms retransmission delay (60 ms*28 retransmitted packets) or 2740 ms. Thus, a link may have lower latency than another link, but may have a higher net transmission time than said other link.

Returning to FIG. 2A, device 200 may include a path selector 210A-210B, referred to generally as path selector(s) 210. Path selectors 210 may comprise hardware or software, or a combination of hardware and software. Path selectors 210 may comprise an application, service, server, daemon, routine, or other executable logic, and may be embodied in software executed by a processor or co-processor, such as co-processor of a network interface card, or may be embodied in a hardware implementation such as an ASIC or FPGA. Path selector 210 may be configured to measure characteristics of a plurality of network links 206 with another device 200, identify characteristics of applications associated with packets, and select a link or path based on the identified and measured characteristics. In many implementations, path selectors 210 may be part of a network stack or network interface.

Although each device 200A-200B is shown to include a path selector 210A, in many implementations, only one device 200 may include a path selector 210. For example, a client device may include a path selector for communicating with a server via a plurality of links, and the server may be configured to respond via the same link or path for any received traffic; accordingly, such a server may not need its own path selector 210.

Path selector 210 may include a packet processing engine, sometimes referred to as a packet engine or a high-speed layer 2-7 integrated packet engine 212. Packet engine 212 may comprise hardware or software, or a combination of hardware and software, and may be implemented as an application, service, server, daemon, routine or other executable logic, or in circuitry such as an ASIC or FPGA. Packet engine 212, is responsible for managing the kernel-level processing of packets received and transmitted by device 200. The packet engine 212 may comprise a buffer for queuing one or more network packets during processing, such as for receipt of a network packet or transmission of a network packet. Additionally, the packet engine 212 is in communication with one or more network stacks to send and receive network packets via one or more network ports. The packet engine 212 may comprise or work with encryption engines, cache managers, policy engines, and/or multi-protocol compression logic (not illustrated).

The packet engine 240 may include a packet processing timer (not illustrated). In one embodiment, the packet processing timer provides one or more time intervals to trigger the processing of incoming, i.e., received, or outgoing, i.e., transmitted, network packets. In some embodiments, the packet engine 212 processes network packets responsive to the timer. The packet processing timer 212 provides any type and form of signal to the packet engine to notify, trigger, or communicate a time related event, interval or occurrence. In many embodiments, the packet processing timer provides time intervals or otherwise causes a network packet to be processed by the packet engine 212 at various time intervals, such as 10 ms, 5 ms, 2 ms, 1 ms, or even sub-millisecond times.

Path selector 210 may include a quality of service or QoS engine 214. QoS engine 214 may comprise hardware or software, or a combination of hardware and software, and may be implemented as an application, service, server, daemon, routine or other executable logic, or in circuitry such as an ASIC or FPGA. QoS engine 214 may identify or classify received packets or traffic flows based on application requirements, such as minimum required latency or maximum allowed loss rate. QoS engine 214 may scan packet headers at any layer of the network stack, such as the application layer, presentation layer, transport layer, or network layer. In many implementations, QoS engine 214 may classify packets or traffic flows based on a source and/or destination address, source and/or destination port, application identifier, direction, and in some cases, further information such as a command or operation (e.g. read or write). In some implementations QoS engine 214 may assign a traffic class to packets based on these requirements. For example, referring briefly to FIG. 2C, illustrated is a table 235 of relative application classes and types, according to one implementation. In the implementation illustrated, network traffic or packets may be assigned to any of three classes: A or low priority traffic; B or medium priority traffic; and C or high priority traffic (as discussed above, these comparisons are relative, and are not intended to imply any absolute priority value). Traffic may be assigned to classes based on its general requirements, such as bulky traffic or traffic for where low latency or immediate reliability is not required (though overall throughput may be required, such as for transfer of large files); real-time traffic where lower latencies are very important, such as real-time video conferencing, remote control, or other such applications; and interactive traffic or standard traffic, which may have lower transfer sizes and may tolerate higher latencies, but may have particular characteristics regarding chattiness or bustiness. Although several example applications are shown, the list is not intended in any way to be exhaustive.

QoS engine 214 or another portion of path selector 210 may also maintain application specific statistics for traffic classification and path selection. As discussed above, in many implementations, applications may have both requirements (e.g. maximum latency, minimum throughput, etc.) and characteristics, such as how burst or chatty application communications are, and how many packets are queued for transfer. For example, referring briefly to FIG. 2D, illustrated is an embodiment of an application characteristic table 240. As shown, the table 240 may include separate entries for applications and servers (e.g. by domain name and/or network address). For example, CIFS traffic to a third server (e.g. example.net) may be listed separately from the first server shown (e.g. example.com). The table may also include separate entries for different application operations (e.g. read and write operations, as shown, as well as any other type and form of operation, such as connection establishment, authentication, etc.). For each entry, the table may include data indicating estimated upstream and downstream chattiness. Chattiness is a measure of the number of packets expected in a communication flow from one entity to the other before expecting a reply or response from the recipient entity. For example, as shown, a CIFS read operation may have low upstream chattiness from a first device to a second device, with the traffic identifying, for example, a file to be read. No response is expected from the second device until the request is complete and the file is fully identified; however, the request is relatively short. By comparison, the downstream chattiness may be much higher, with the requested file being transferred from the second device to the first device, and no response expected until the file transfer is complete or a NACK or ACK is sent. As shown, chattiness may be specific to applications, servers (e.g. some servers may hold larger files for transfer than other servers), and operation (e.g. reflecting the direction that the majority of the data flows for a given transaction). The chattiness values may be estimated or predicted values and may be based on a weighted average or smoothed data from previous estimated or predicted values and current measured chattiness. As shown, table 240 may also include a measure of current queueing information for each entry, reflecting how many packets of the application are queued. This may be used to estimate how much more data will be transferred and/or may be used to infer an application operation. For example, given CIFS traffic to example.com as shown, if 14 packets are currently queued for scheduling by the path selector, the system may deterministically estimate the likely size of the train of packets. This may be used in some implementations to avoid deep packet inspection, with the queue length used to infer application operation.

Returning to FIG. 2A, path selector 210 may include a path quality estimator 216. Path quality estimator 216 may comprise hardware or software, or a combination of hardware and software, and may be implemented as an application, service, server, daemon, routine or other executable logic, or in circuitry such as an ASIC or FPGA. Path quality estimator 216 may be configured to compare characteristics of different potential paths in order to select an appropriate path for an application or traffic flow. In some implementations, discussed in more detail below in connection with FIGS. 3A and 3B, path quality estimator 216 may also be configured to calculate a prediction of application chattiness or burstiness based on a weighted average or exponential smoothing of prior measurements and estimates of application chattiness or burstiness, and may be configured to adjust weights for the calculation based on how accurate previous predictions were.

Path selector 210 may include an application-based path orderer 218, sometimes referred to as a flow prioritizor or path prioritizor. Path orderer 218 may comprise hardware or software, or a combination of hardware and software, and may be implemented as an application, service, server, daemon, routine or other executable logic, or in circuitry such as an ASIC or FPGA, and may be configured to determine an order of selection of a plurality of paths, based on path quality estimations from quality estimator 216, and application requirements identified by QoS engine 214.

Path selector 210 may include a path switcher 220. Path switcher 220 may comprise hardware or software, or a combination of hardware and software, and may be implemented as an application, service, server, daemon, routine or other executable logic, or in circuitry such as an ASIC or FPGA, and may be configured to steer, route, or forward packets or traffic flows via a selected path 206, according to an order provided by application-based path orderer 218. In some implementations, path switcher 220 may comprise a high-speed switch. A received packet may be temporarily buffered until a path is selected, and then switched to the designated path. In some implementations, switching the path may comprise routing the packet to a different physical output. In other implementations, switching the path may comprise modifying a header of the packet, such as a network or physical layer header (e.g. modifying a source network or media access control (MAC) address). In still other implementations, switching the path may comprise adding a path identifier to the packet to indicate to a downstream entity (e.g. switch, router, etc.) to steer the packet via a specified path.

In some implementations, path selector 210 may perform load balancing among a plurality of potential paths according to a determined link order. For example, as discussed in more detail below, a first link may be identified as the "best" link for a particular traffic flow, with a second link being identified as "second best", and a third link as "third best", etc. Ideally, all of the traffic may be steered via the first link; however, in practice, if too much traffic of the corresponding class is received or scheduled for transfer, steering all of the traffic via the first link may result in overloading the link. Accordingly, in some implementations, the path selector may load balance among the links via a weighted round robin or similar algorithm, with weights assigned according to the order (such that most of the traffic is directed via the "best" link for the traffic class and the least traffic directed via the "worst" link for the traffic class). The weighting utilized may be the same or different for different classes (for example, a "best" link may be given a weight of 0.6 for class A traffic; a "second best" link given a weight of 0.3; and a "third best" link given a weight of 0.1; while for Class C traffic, the corresponding weights may be 0.8; 0.2; and 0.0, respectively). The different weighting may be used, for example, in implementations in which the traffic classes themselves are imbalanced.

Path selector 210 may comprise or maintain one or more databases or data stores 222 comprising application and network characteristic data, such as the data illustrated in the tables of FIGS. 2B-2D. The data may be stored in any type and form of data structure, such as a database, flat file, indexed file, relational database, or any other form of data file, and may be maintained by one or more of path orderer 218, quality estimator 216, and/or QoS engine 214, or other parts of path selector 210.

The systems discussed above may utilize the three traffic classes discussed above and shown in FIG. 2C as follows. First, for low priority or class A traffic, for an application such as file transfer (e.g. FTP traffic), it is sufficient to transfer the packet with best effort. If one path may deliver the data faster than another path, then it may be the preferred path. Given a first path A with 100 ms delay with 1% packet drop, and a second Path B with 60 ms delay with 2% packet drop, with both links having bandwidth of 8 Mbps and packet size of 1500 bytes, each path can transmit 667 packets every 1 sec (e.g. 8 Mbps/(1500*8 bits)).

This means that every second, Path A with 1% loss would have lost 7 packets; and Path B, with 2% loss, would have lost 14 packets. Assuming all the packet drops are independent, Path A leads to 7 retransmissions, and path B leads to 14 re-transmission. This means, for a TCP based connection, the net time for transmission of 667 packets on Path A equals 100 ms propagation delay+7*100 ms retransmission delay+1 s transmission delay=1800 ms. For path B, the net transmission time is 60 ms propagation delay+14*60 ms retransmission delay+1 s transmission delay=1900 ms. Thus, by comparing the net transmit time of 667 packets, it is clear that path A will be a better path than that of path B for the file transfer, even though path A has higher latency than path B.

Generalized, the above determination may be performed sending traffic between the devices on the various paths to measure packet loss rates of the paths and latency between the paths:

Path_a with a % packet loss and a'ms latency a" bandwidth;

Path_b with b % packet loss and b' ms latency b" bandwidth; and

Path_c with c % packet loss and c' ms latency c" bandwidth; etc.

Relative transmission time of N packets in each of the paths may be calculated as:

n's ms propagation delay+N/x" transmission delay+ N*x/100 retransmission delay.

The least time taken amongst path_x, path_y, path_z may be considered the "best" path for class A traffic, with traffic balanced accordingly.

In a further implementation, some paths may be marked as "bad" or not to be used for traffic of the class, based on a configurable threshold. Specifically, in some such implementations, if the net transmission time of a given path is more than 50% worse than the net transmission time of the best path, then the given path may be excluded from use for the traffic (e.g. if net transmission time t+t*threshold percentage>min(other path net transmission times), the path may be excluded from use). In a still further implementation, the path may be included or utilized for very low priority bulk traffic or if bandwidth utilization of the set of paths exceeds a threshold.

Skipping ahead briefly to Class C traffic, this kind of traffic is sensitive to packet jitter and high latency but can withstand packet drops to a certain level. For example, video conferencing traffic is highly sensitive to delays, but video encoding and compression algorithms are able to repair or recover from dropped packets easily. In such cases, the paths may be ordered based on measured latency. In some implementations, paths may be excluded from the order if the path jitter and/or packet loss rate exceed configured thresholds.

Path selection for Class B traffic is more complex and takes into account application chattiness. The system may measure the average size of the train of packets based on the service. If the train of packets sent is larger than a predetermined threshold (e.g. greater than 30 packets, or any other such threshold), the system may use similar logic to that used for Class A bulk traffic above, or order paths based on the net transmission time.

However, if the traffic is very chatty (e.g. with average packet train length being less than the threshold), then the impact of packet drops could be huge because of retransmission delays. In such cases, the paths may be ordered with similar logic to Class C traffic above: paths with loss rates above a threshold may be excluded from the order, and remaining paths ordered based on latency.

In effect, with multiple paths, each class of application may have a different order of paths, and hence the system may effectively use all the paths.

Figure 3A:
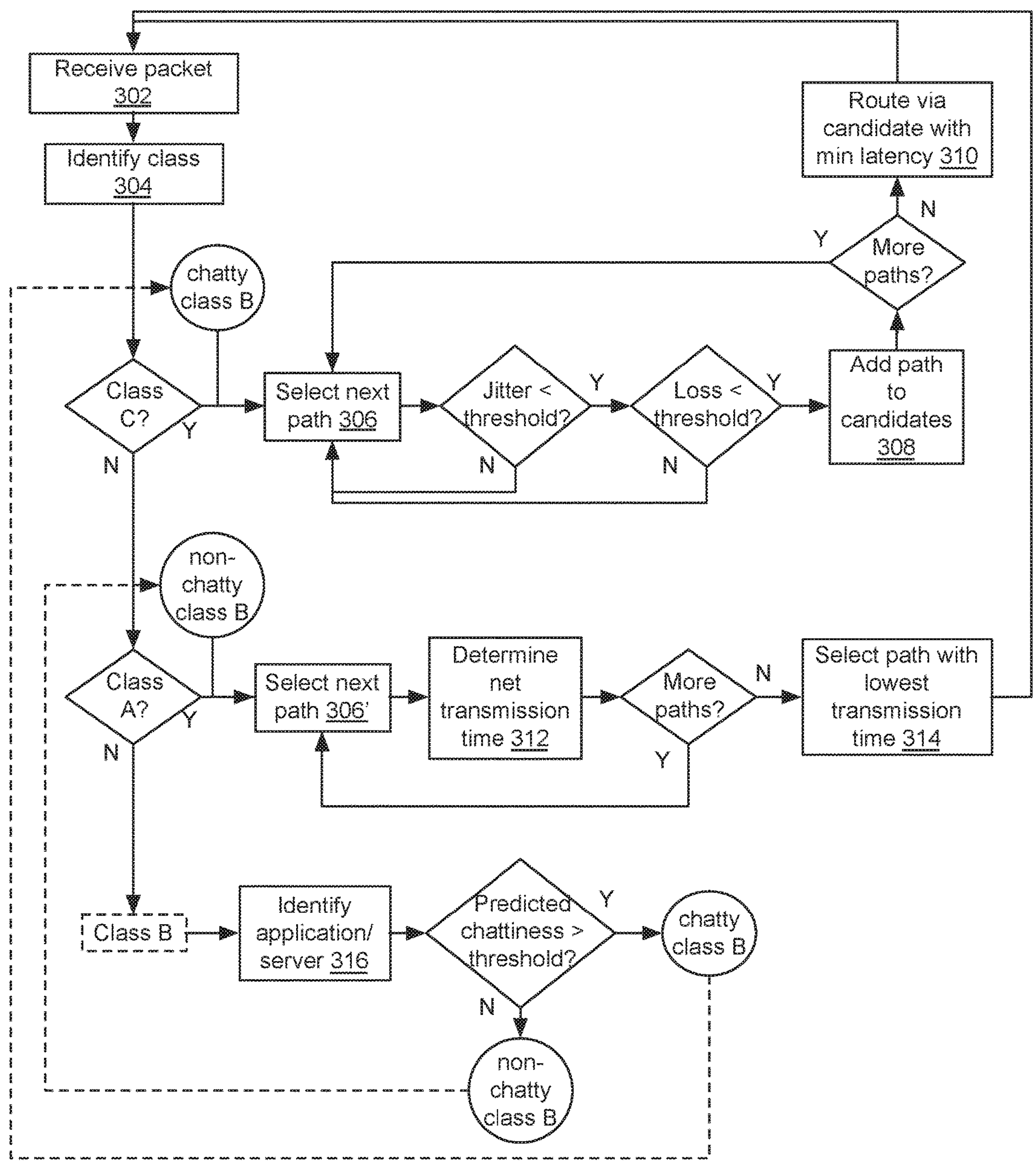
FIG. 3A is a flow chart of an implementation of a method for application-centric network path selection.

FIG. 3A is a flow chart of an implementation of a method for application-centric network path selection. In some implementations, the method may begin with establishment of the multiple paths or links between the devices and/or exchange of test packets (or non-prioritized data packets) to measure latency, loss rates, round trip times, etc.

At step 302, the device may receive a packet. The packet may be received from another device (e.g. a client or server) or may be received from an application on the device. Thus, as discussed above, the device may originate the packet or may server as an intermediary for the communication.

At step 304, the device may identify a traffic class for the packet. Identifying the class may comprise identifying a traffic flow corresponding to the class and may comprise identifying the flow by source and/or destination addresses (including network addresses and MAC addresses), ports, destination servers or domains, application types or identifiers at the application, session, or presentation layers, or any other type and form of information.

If the traffic is identified as real-time or class C traffic, then as discussed above, the system may select a path with the lowest latency from a set of candidate paths that have jitter and loss rates below thresholds. Specifically, at step 306, the path selector may select a first path, and determine whether jitter on the path is below a first threshold; and loss rate of the path is below a second threshold. If so, the path may be added to a set of candidates at step 308 or included in path ordering. This may be repeated for each additional established path. At step 310, the path selector may select a path from the candidates having a minimum latency, and direct the packet (and in some implementations, any further traffic or queued packets from the flow) via the selected path. In some implementations as discussed above, the path selector may not select the path having the lowest latency, for load balancing reasons, but may instead select from among the candidate paths according to weights based on the latency of each candidate path.

If the traffic is identified as bulk or class A traffic, then as discussed above, the system may select a path with the lowest net transmission time. At step 312, the system may determine the net transmission time for each path based on the bandwidth, latency, and loss rate, as discussed above, with the net transmission time equal to a time to transmit N packets (e.g. 1 second) plus a transmission latency plus N times the loss rate times a retransmission latency. This may be repeated for each additional path as shown. At step 314, the path selector may select the path with the lowest transmission time, and direct the packet (and in some implementations, any further traffic or queued packets from the flow) via the selected path. In some implementations as discussed above, the path selector may not select the path having the lowest transmission time, for load balancing reasons, but may instead select from among the candidate paths according to weights based on the transmission time of each candidate path. In a further implementation, as discussed above, paths may be excluded from load balancing if their net transmission time is greater than a threshold multiplied by the lowest net transmission time t (e.g. time t+t*threshold, with threshold >0, e.g. 0.5).

If instead the traffic is identified as interactive or class B, then at step 316, the path selector may identify the application and server corresponding to the traffic. In some implementations, this may be done based on the source and destination addresses and ports, while in other implementations, the application and/or server may be identified via inspection of packet headers at the application, presentation, or session layers. Similarly, in some implementations, an operation may be identified, such as a read or write operation. The operation may be identified based on explicit identifiers in a packet header or body, or may be inferred based on a length of queued packets and a transfer direction, in comparison to average or estimated packet train length or chattiness as discussed above.

If the predicted chattiness is over a threshold, then the traffic may be considered 'chatty', and the path selector may identify a lowest latency path or select according to path latency as discussed above in connection with class C traffic, repeating steps 306-310. Conversely, if the predicted chattiness is below a threshold, then the traffic may be considered 'non-chatty', and the path selector may identify a lowest transmission time path or select according to transmission times as discussed above in connection with class A traffic, repeating steps 306' to 314.

Figure 3B:
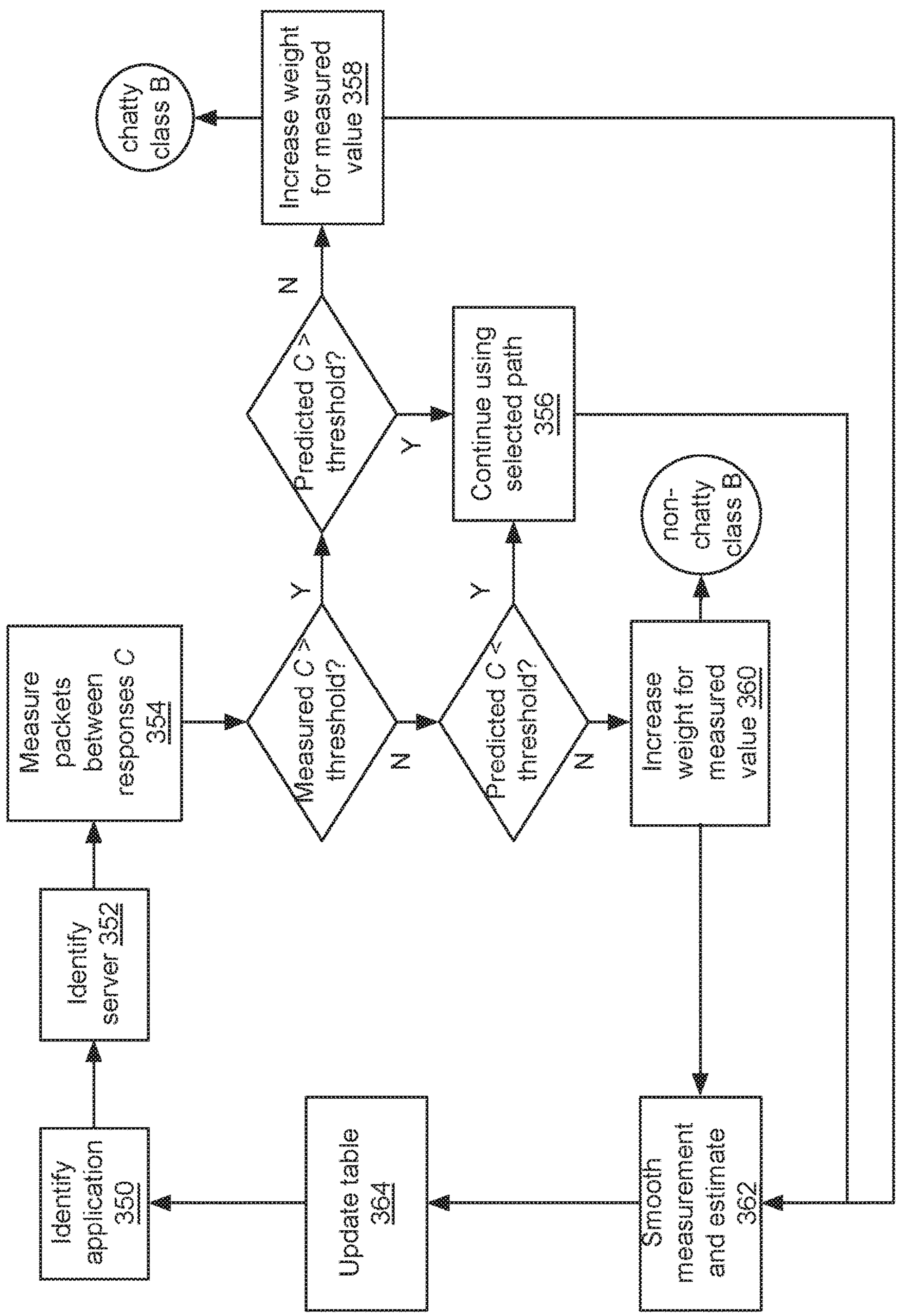
FIG. 3B is a flow chart of an implementation of a method for updating application characteristics.

Chattiness can be measured and estimated as shown in the flow chart of FIG. 3B, which illustrates an implementation of a method for updating application characteristics. The path selector may perform the method of FIG. 3B in parallel with the method of FIG. 3A for any class B traffic, and in particular, may update chattiness estimates as shown.

Specifically, at step 350, the path selector may identify the application, and at step 352, may identify the corresponding server. In some implementations, these identifications may have already been performed for the traffic at step 316 of FIG. 3A. At step 354, the path selector may measure the chattiness C or a number of packets of a traffic flow or train between responses or replies from the other end. This measurement may be used to update a previous chattiness estimate via a smoothing function or weighted average at step 362 (e.g. estimated chattiness=$k_1$*measured chattiness+$k_2$*previous estimated chattiness, with $k_1$, $k_2$ being weighting coefficients). In some implementations, multiple previous estimates may be used in the weighting (e.g. with further coefficients). The application characteristic tables may be updated with the new estimated chattiness at step 364.

In some implementations as illustrated, the coefficient weights may be adjusted based on accuracy or inaccuracy of the previous estimate. Specifically, in the implementation shown, if the measured chattiness is above a threshold and the previous estimated chattiness for the application was also above the threshold; or the measured chattiness was below the threshold and the previous estimated chattiness was below the threshold, then the estimate was accurate or correct (though exact matching is not necessarily required). If the estimate was accurate, then at step 356, the path selector may continue using the path selected per the method of FIG. 3A for the traffic as discussed above, and the estimate may be updated at step 362 with the measured chattiness being given a low coefficient, and the previously estimated chattiness being given a high coefficient.

However, if the measured chattiness is above a threshold and the previous estimated chattiness for the application was not above the threshold, then the previous estimate (and the corresponding path selection) was inaccurate. At step 358, the coefficient weight for the measured chattiness may be increased, and the estimate recalculated at step 362. Additionally, in some implementations, traffic of the application may be re-steered to a lowest latency path as discussed above for class C traffic. That is, because the previous estimated chattiness was below the threshold, traffic had been routed as if it were non-chatty class B traffic; upon determining that the estimate was incorrect and the measured chattiness is above the threshold, the traffic may be instead routed as if it were chatty class B traffic, as shown in FIG. 3A.

Similarly, if the measured chattiness is not above the threshold and the previous estimated chattiness for the application was above the threshold, then the previous estimate (and the corresponding path selection) was similarly inaccurate. At step 360, the coefficient weight for the measured chattiness may be increased, and the estimate recalculated at step 362. Additionally, in some implementations, traffic of the application may be re-steered to a lowest net transmission time path as discussed above for class A traffic. That is, because the previous estimated chattiness was above the threshold, traffic had been routed as if it were chatty class B traffic; upon determining that the estimate was incorrect and the measured chattiness is below the threshold, the traffic may be instead routed as if it were non-chatty class B traffic, as shown in FIG. 3A.

Chattiness thresholds may be predetermined or configured by a user or administrator of the system or, in some implementations, may be dynamically determined. Specifically, in some implementations, the chattiness threshold may be determined based on the net bandwidth delay product of the appliance (e.g. bandwidth*round trip time), divided by the average number of active connections scheduled in the system during a time window corresponding to the round-trip time. For example, given a connection with bandwidth of 100 Mbps and round-trip time of 100 ms, the bandwidth delay product is 1,250,000 bytes or approximately 833 packets for an MTU of 1500 B. If there are approximately 40 connections scheduled within the round-trip time, then the threshold may be equal to 833/40 or approximately 20 packets.

Accordingly, the systems and methods discussed herein provide for network communications via a plurality of paths, responsive to network traffic characteristics such as class, QoS requirements, application, network delay, loss rates, jitter, bandwidth, and application chattiness. Path selection may be application-specific, as one path that is bad or inadequate for the requirements of one application may be good or adequate for the requirements of a second application. By taking into account application-specific communications characteristics, as well as network path characteristics, path selection may be optimized, resulting in higher quality of service for each application, better throughput, and more efficient use of bandwidth and network resources.

Although the disclosure may reference one or more "users", such "users" may refer to user-associated devices or stations (STAs), for example, consistent with the terms "user" and "multi-user" typically used in the context of a multi-user multiple-input and multiple-output (MU-MIMO) environment.

Although examples of communications systems described above may include devices and APs operating according to an 802.11 standard, it should be understood that embodiments of the systems and methods described can operate according to other standards and use wireless communications devices other than devices configured as devices and APs. For example, multiple-unit communication interfaces associated with cellular networks, satellite communications, vehicle communication networks, and other non-802.11 wireless networks can utilize the systems and methods described herein to achieve improved overall capacity and/or link quality without departing from the scope of the systems and methods described herein.

It should be noted that certain passages of this disclosure may reference terms such as "first" and "second" in connection with devices, mode of operation, transmit chains, antennas, etc., for purposes of identifying or differentiating one from another or from others. These terms are not intended to merely relate entities (e.g., a first device and a second device) temporally or according to a sequence, although in some cases, these entities may include such a relationship. Nor do these terms limit the number of possible entities (e.g., devices) that may operate within a system or environment.

It should be understood that the systems described above may provide multiple ones of any or each of those components and these components may be provided on either a standalone machine or, in some embodiments, on multiple machines in a distributed system. In addition, the systems and methods described above may be provided as one or more computer-readable programs or executable instructions embodied on or in one or more articles of manufacture. The article of manufacture may be a hard disk, a CD-ROM, a flash memory card, a PROM, a RAM, a ROM, or a magnetic tape. In general, the computer-readable programs may be implemented in any programming language, such as LISP, PERL, C, C++, C#, PROLOG, or in any byte code language such as JAVA. The software programs or executable instructions may be stored on or in one or more articles of manufacture as object code.

While the foregoing written description of the methods and systems enables one of ordinary skill to make and use what is considered presently to be the best mode thereof, those of ordinary skill will understand and appreciate the existence of variations, combinations, and equivalents of the specific embodiment, method, and examples herein. The present methods and systems should therefore not be limited by the above described embodiments, methods, and examples, but by all embodiments and methods within the scope and spirit of the disclosure.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

While various embodiments of the methods and systems have been described, these embodiments are illustrative and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the illustrative embodiments and should be defined in accordance with the accompanying claims and their equivalents.

What is claimed is:

1. A method for application-based network path selection, comprising:

establishing, by a first device, communications with a second device via each of a first network path and a second network path;

identifying, by the first device, an application corresponding to a packet for transmission;

determining, by the first device, whether an estimated chattiness of the application exceeds a threshold; and transmitting, by the first device to the second device, the packet via a selected one of the first network path and the second network path, wherein the first network path is selected responsive to the estimated chattiness exceeding the threshold and the first network path having a lower net transmission time for the predetermined number of packets than the second network path, and the second network path is selected responsive to the estimated chattiness not exceeding the threshold and the second network path having a lower latency than the first network path.

2. The method of claim 1, further comprising:

measuring a chattiness of the application; and recalculating the estimated chattiness as a weighted average of the measured chattiness of the application and at least one prior measured chattiness of the application.

3. The method of claim 2, wherein the packet is transmitted via the first network path, and further comprising:

determining that the measured chattiness of the application does not exceed the threshold; and responsive to the determination that the measured chattiness of the application does not exceed the threshold, transmitting an additional received packet corresponding to the application via the second network path.

4. The method of claim 2, wherein the packet is transmitted via the second network path, and further comprising:

determining that the measured chattiness of the application exceeds the threshold; and responsive to the determination that the measured chattiness of the application exceeds the threshold, transmitting an additional received packet corresponding to the application via the first network path.

5. The method of claim 2, wherein recalculating the estimated chattiness further comprises:

determining that the measured chattiness and the estimated chattiness have values on opposite sides of the threshold; and responsive to the determination that the measured chattiness and the estimated chattiness have values on opposite sides of the threshold, increasing a weight for the measured chattiness in the weighted average.

6. The method of claim 2, wherein recalculating the estimated chattiness further comprises:

determining that the measured chattiness and the estimated chattiness have values on the same side of the threshold; and responsive to the determination that the measured chattiness and the estimated chattiness have values on the same side of the threshold, decreasing a weight for the measured chattiness in the weighted average.

7. The method of claim 1, further comprising identifying a priority level of the received packet, from a plurality of predetermined priority levels.

8. The method of claim 7, wherein the received packet has a first priority level, and further comprising:

receiving an additional packet having a second priority level lower than the first priority level; and responsive to the additional packet having the second priority level lower than the first priority level and responsive to the first network path having lower net transmission time for the predetermined number of packets than the second network path, transmitting the additional packet via the first network path.

9. The method of claim 7, wherein the received packet has a first priority level, and further comprising:

receiving an additional packet having a second priority level higher than the first priority level; and responsive to the additional packet having the second priority level higher than the first priority level and responsive to the second network path having lower latency than the first network path, transmitting the additional packet via the second network path.

10. The method of claim 1, wherein determining whether the estimated chattiness of the application exceeds the threshold further comprises calculating the threshold based on a bandwidth delay product and an average number of active connections between the first device and the second device.

11. A system for application-based network path selection, comprising:

a first device in communication with a second device via each of a first network path and a second network path;

wherein the first device comprises a path selector configured to:

identify an application corresponding to a packet to be transmitted, determine whether an estimated chattiness of the application exceeds a threshold, and select either the first network path or the second network path, wherein the first network path is selected responsive to the estimated chattiness exceeding the threshold and the first network path having a lower net transmission time for the predetermined number of packets than the second network path; and the second network path is selected responsive to the estimated chattiness not exceeding the threshold and the second network path having a lower latency than the first network path; and wherein the first device is configured to transmit the packet via the selected network path to the second device.

12. The system of claim 11, wherein the path selector is further configured to:

measure a chattiness of the application; and recalculate the estimated chattiness as a weighted average of the measured chattiness of the application and at least one prior measured chattiness of the application.

13. The system of claim 12, wherein the packet is transmitted via the first network path, and wherein the path selector is further configured to:

determine that the measured chattiness of the application does not exceed the threshold, and responsive to the determination that the measured chattiness of the application does not exceed the threshold, select to transmit an additional received packet corresponding to the application via the second network path.

14. The system of claim 12, wherein the packet is transmitted via the second network path, and wherein the path selector is further configured to:

determine that the measured chattiness of the application exceeds the threshold; and responsive to the determination that the measured chattiness of the application exceeds the threshold, select to transmit an additional received packet corresponding to the application via the first network path.

15. The system of claim 12, wherein the path selector is further configured to:

determine that the measured chattiness and the estimated chattiness have values on opposite sides of the threshold; and responsive to the determination that the measured chattiness and the estimated chattiness have values on opposite sides of the threshold, increase a weight for the measured chattiness in the weighted average.

16. The system of claim 12, wherein the path selector is further configured to:

determine that the measured chattiness and the estimated chattiness have values on the same side of the threshold; and responsive to the determination that the measured chattiness and the estimated chattiness have values on the same side of the threshold, decrease a weight for the measured chattiness in the weighted average.

17. The system of claim 11, wherein the path selector is further configured to identify a priority level of the received packet, from a plurality of predetermined priority levels.

18. The system of claim 17, wherein the received packet has a first priority level, and wherein the path selector is further configured to:

responsive to an additional packet received by the first device for transmission to the second device having a second priority level lower than the first priority level and responsive to the first network path having lower net transmission time for the predetermined number of packets than the second network path, select to transmit the additional packet via the first network path.

19. The system of claim 17, wherein the received packet has a first priority level, and wherein the path selector is further configured to:

responsive to an additional packet, received by the first device for transmission to the second device, having a second priority level higher than the first priority level and responsive to the second network path having lower latency than the first network path, select to transmit the additional packet via the second network path.

20. The system of claim 11, wherein the path selector is further configured to calculate the threshold based on a bandwidth delay product and an average number of active connections between the first device and the second device.

* * * * *